(12) United States Patent
Alanazi

(10) Patent No.: US 11,477,221 B2
(45) Date of Patent: Oct. 18, 2022

(54) SYSTEM AND METHOD FOR PROTECTING A COMMUNICATION DEVICE AGAINST IDENTIFICATION OUTSIDE A COMPUTER NETWORK BY ROUTING TRAFFIC THROUGH A SMART HUB

(71) Applicant: Saudi Arabian Oil Company, Dhahran (SA)

(72) Inventor: Salman Abdullah Alanazi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 173 days.

(21) Appl. No.: 16/684,152

(22) Filed: Nov. 14, 2019

(65) Prior Publication Data

US 2021/0152578 A1    May 20, 2021

(51) Int. Cl.
*H04L 29/06* (2006.01)
*H04L 9/40* (2022.01)

(52) U.S. Cl.
CPC ...... *H04L 63/1425* (2013.01); *H04L 63/0272* (2013.01); *H04L 63/1416* (2013.01); *H04L 63/1491* (2013.01); *H04L 63/20* (2013.01)

(58) Field of Classification Search
CPC ............. H04L 63/1425; H04L 63/0272; H04L 63/1416; H04L 63/1491; H04L 63/20; H04L 63/0421; H04L 63/029; H04L 63/0414; H04L 63/0428; G06N 20/00; G06F 21/6254; H04W 88/08

See application file for complete search history.

(56) References Cited

U.S. PATENT DOCUMENTS

| | | | |
|---|---|---|---|
| 6,738,910 B1 * | 5/2004 | Genty | H04L 12/4633 713/166 |
| 7,170,860 B2 | 1/2007 | Partridge et al. | |
| 2016/0080415 A1 * | 3/2016 | Wu | H04L 63/1491 726/23 |
| 2017/0126628 A1 * | 5/2017 | Krishna | H04L 63/0428 |

(Continued)

OTHER PUBLICATIONS

Zico Deng. "How VPN Works?" Article published Sep. 7, 2018 (10 pages) https://zicodeng.medium.com/how-vpn-worksb7549dcc6ce4#:~:text=Encapsulation%20is%20really%20%just%20just%20a,will%20be%20routed%20as%20normal. (Year: 2018).*

(Continued)

*Primary Examiner* — Joseph P Hirl
*Assistant Examiner* — Thomas A Gyorfi
(74) *Attorney, Agent, or Firm* — Leason Ellis LLP

(57) ABSTRACT

A system, a method, and a computer program for protecting data traffic from a communication device against fingerprinting or privacy leakage. The method can include receiving data traffic from a communication device connected to a network, analyzing the received data traffic to determine network activity or operational characteristics of the communication device, generating forged data traffic for the network based on the determined network activity or operational characteristic of the communication device, and transmitting the forged data traffic to an external communication device that is located outside the network. The forged data traffic can add an entropy factor to the data traffic from said communication device connected to the network.

29 Claims, 6 Drawing Sheets

(56) References Cited

U.S. PATENT DOCUMENTS

| | | | |
|---|---|---|---|
| 2017/0310706 A1* | 10/2017 | Wu | H04L 63/029 |
| 2018/0288007 A1 | 10/2018 | Poornachandran et al. | |
| 2019/0159035 A1* | 5/2019 | Town | H04L 63/1441 |
| 2020/0153861 A1* | 5/2020 | Park | H04L 61/103 |

OTHER PUBLICATIONS

Yoshigoe, Kenji, et al. "Overcoming invasion of privacy in smart home environment with synthetic packet injection." 2015 TRON Symposium (TRONSHOW). IEEE, 2015.

International Search Report and Written Opinion in Corresponding PCT Application No. PCT/US2020/058480 dated Jan. 28, 2021. 10 pages.

AppGate SDP IoT Connector brochure by Cyxtera Technologies, Inc. ("AppGate Connector," attached as D1).

Apthorpe, Noah, Dillon Reisman, and Nick Feamster. "Closing the blinds: Four strategies for protecting smart home privacy from network observers." arXiv preprint arXiv:1705.06809 (2017).

Apthorpe, Noah, Dillon Reisman, and Nick Feamster. "A smart home is no castle: Privacy vulnerabilities of encrypted Iot traffic." arXiv preprint arXiv:1705.06805 (2017).

Amar, Yousef, et al. "An analysis of home IoT network traffic and behaviour." arXiv preprint arXiv:1803.05368 (2018).

Meidan, Yair, et al. "ProfilIoT: a machine learning approach for IoT device identification based on network traffic analysis." Proceedings of the symposium on applied computing. ACM, 2017.

Chen Chen, et al., "TARANET: Traffic-Analysis Resistant Anonymity at the Network Layer" ("Chen article," attached as D4.

Apthorpe, Noah, et al. "Spying on the smart home: Privacy attacks and defenses on encrypted iot traffic." arXiv preprint arXiv:1708.05044 (2017).

Malekzadeh, Mohammad, and Hamed Haddadi. "Towards Privacy-Preserving IoT Data Publishing."

Romkey, John. "Toast of the IoT: the 1990 interop internet toaster." IEEE Consumer Electronics Magazine 6.1 (2016): 116-119.

Balte, Ashvini, Asmita Kashid, and Balaji Patil. "Security issues in Internet of things (IoT): A survey." International Journal of Advanced Research in Computer Science and Software Engineering 5.4 (2015).

* cited by examiner

SYSTEM AND METHOD FOR PROTECTING A COMMUNICATION DEVICE AGAINST IDENTIFICATION OUTSIDE A COMPUTER NETWORK BY ROUTING TRAFFIC THROUGH A SMART HUB

FIELD OF THE DISCLOSURE

The present disclosure relates to a system, method and computer program for protecting a communication device in a computer network against identification or privacy leakage outside of the computer network.

BACKGROUND OF THE DISCLOSURE

The Internet is a worldwide network of interconnected computer networks that use the Transmission Control Protocol/Internet Protocol (TCP/IP) to link communication devices worldwide. The Internet includes private, public, academic, business, and government networks, all of which are interlinked by arrays of electronic, wireless, wired, or optical networking technologies. The Internet carries a broad range of information resources and services, including the World Wide Web (WWW), electronic mail, telephony, and file sharing. As the Internet evolves and network systems become increasingly under attack, cybersecurity solutions are taking on greater importance. However, existing cybersecurity solutions have significant shortcomings that are addressed by the technology solution provided in this disclosure.

SUMMARY OF THE DISCLOSURE

The disclosure provides a novel technology solution, including a method, a system, and a computer program for protecting communication devices in a computer network against identification or privacy leakage from outside the computer network.

A method is provided for protecting data traffic from a communication device against fingerprinting or privacy leakage, wherein the method can comprise receiving data traffic from a communication device connected to a network, analyzing the received data traffic to determine network activity or operational characteristics of the communication device, generating forged data traffic for the network based on the determined network activity or operational characteristic of the communication device, and transmitting the forged data traffic to an external communication device that is located outside the network, wherein the forged data traffic adds an entropy factor to the data traffic from said communication device connected to the network. The method can comprise at least one of encrypting the forged data traffic before transmitting the forged data traffic to the external communication device, training a machine learning model based on the analysis of the received data traffic, or updating a machine learning model based on the analysis of the received data traffic or the determined network activity or operational characteristics of said communication device. The external communication device can comprise an Internet Service Provider server. The communication device can comprise an Internet-of-Things (IoT) device.

In the method, generating the forged data traffic can comprise at least one of normalizing data traffic based on the network activity or operational characteristics of the communication device, randomizing data traffic based on the network activity or operational characteristics of the communication device, and synthesizing data traffic based on the network activity or operational characteristics of the communication device. Generating the forged data traffic can comprise generating a fabricated destination address. Generating the forged data traffic can comprise generating a fabricated source address. Randomizing data traffic can comprise generating a fabricated source address or a fabricated destination address. Synthesizing data traffic can comprise generating at least one of a fabricated source address, a fabricated destination address and payload content data. The forged data traffic can comprise encrypted data. The fabricated destination address can comprise a website on the Internet.

In the method, transmitting the forged data traffic to the external communication device can comprise sending the forged data traffic through a virtual private network (VPN) tunnel. Transmitting the forged data traffic to the external communication device can comprise dividing the forged data traffic into two or more forged data traffic streams, or sending the forged data traffic streams through two or more virtual private network (VPN) tunnels, wherein the two or more forged data traffic streams include the received data from said communication device.

A system is provided for protecting data traffic from a communication device against fingerprinting or privacy leakage, wherein the system can comprise a receiver arranged to receive data traffic from a communication device connected to a network, an activity monitor arranged to analyze the received data traffic to determine network activity or operational characteristics of the communication device, a traffic synthesizer arranged to generate forged data traffic for the network based on the determined network activity or operational characteristic of the communication device, and a transmitter arranged to transmit the forged data traffic to an external communication device that is located outside the network, wherein the forged data traffic adds an entropy factor to the data traffic from said communication device connected to the network. The external communication device can comprise an Internet Service Provider server. The communication device can comprise an Internet-of-Things (IoT) device.

The system can comprise one or more of a source/destination synthesizer arranged to generate at least one of a fabricated source address and a fabricated destination address, an encryptor arranged to encrypt the forged data traffic before transmitting the forged data traffic to the external communication device, a machine learning model, or a virtual private network (VPN) router arranged to send the transmitted forged data traffic to the external communication device through a virtual private network (VPN) tunnel. At least one of the activity monitor and traffic synthesizer can comprise the machine learning model.

In the system, the forged data traffic can comprise a fabricated source address. The forged data traffic can comprise encrypted data. The fabricated destination address can comprise a website on the Internet.

In the system, the traffic synthesizer can be arranged to normalize, randomize or synthesize data traffic based on the network activity or operational characteristics of the communication device. The randomized data traffic can comprise a fabricated source address or a fabricated destination address. The synthesized data traffic can comprise at least one of a fabricated source address, a fabricated destination address and synthesized payload content data. The machine learning model can be trained or updated based on the analysis of the received data traffic or the determined network activity or operational characteristics of said communication device.

In the system, the VPN router can be arranged to divide the forged data traffic into two or more forged data traffic streams or send the forged data traffic streams through two or more virtual private network (VPN) tunnels, wherein the two or more forged data traffic streams include the received data from said communication device.

A non-transitory computer readable storage medium is provided, storing computer program instructions that, when executed by a computing device, add an entropy factor to data traffic from a communication device to prevent fingerprinting or privacy leakage. The computer program instructions can comprise the steps of receiving data traffic from a communication device connected to a network, analyzing the received data traffic to determine network activity or operational characteristics of the communication device, generating forged data traffic for the network based on the determined network activity or operational characteristic of the communication device, and transmitting the forged data traffic to an external communication device that is located outside the network, wherein the forged data traffic adds an entropy factor to the data traffic from said communication device connected to the network.

A method is provided for protecting data traffic from a communication device against fingerprinting or privacy leakage, wherein the method can comprise receiving data traffic from a communication device connected to a network, parsing a device identification value for the communication device from the received data traffic, and determining at least one of (i) a data transmission rate based on a first portion of the device identification value, (ii) a number of destinations based on a second portion of the device identification value, and (iii) a data payload size based on a third portion of the device identification value. The method can comprise generating forged data traffic for the communication device based on the determined at least one of data transmission rate, number of destinations and data payload size, and transmitting the forged data traffic to an external communication device that is located outside the network, wherein the forged data traffic adds an entropy factor to the data traffic from said communication device connected to the network. The external communication device can comprise an Internet Service Provider server. The communication device can comprise an Internet-of-Things (IoT) device.

The method can comprise analyzing the received data traffic to determine network activity or operational characteristics of the communication device, and generating forged data traffic for the network based on the determined network activity or operational characteristic of the communication device.

The method can comprise scheduling transmission of the forged data traffic for the communication device based on the determined at least one of data transmission rate, number of destinations and data payload size.

The method can comprise encrypting the forged data traffic before transmitting the forged data traffic to the external communication device.

In the method, generating the forged data traffic can comprise generating a fabricated destination address or generating a fabricated source address. The forged data traffic can comprise encrypted data. The fabricated destination address can comprise a web site on the Internet.

The method can comprise training a machine learning model based on the analysis of the received data traffic.

The method can comprise updating a machine learning model based on the analysis of the received data traffic or the determined network activity or operational characteristics of said communication device.

In the method, transmitting the forged data traffic to the external communication device can comprise sending the forged data traffic through a virtual private network (VPN) tunnel.

In the method, transmitting the forged data traffic to the external communication device can comprise dividing the forged data traffic into two or more forged data traffic streams or sending the forged data traffic streams through two or more virtual private network (VPN) tunnels, wherein the two or more forged data traffic streams can include the received data from the communication device.

A system is provided for protecting data traffic from a communication device against fingerprinting or privacy leakage, wherein the system can comprise a receiver arranged to receive data traffic from a communication device connected to a network and a traffic synthesizer arranged to (1) parse a device identification value for the communication device from the received data traffic and determine at least one of (i) a data transmission rate based on a first portion of the device identification value, (ii) a number of destinations based on a second portion of the device identification value, and (iii) a data payload size based on a third portion of the device identification value, and (2) generate forged data traffic for the communication device based on the determined at least one of data transmission rate, number of destinations and data payload size. The system can comprise a transmitter arranged to transmit the forged data traffic to an external communication device that is located outside the network. The forged data traffic can add an entropy factor to the data traffic from the communication device connected to the network. The external communication device can comprise an Internet Service Provider server. The communication device can comprise an Internet-of-Things (IoT) device.

The system can comprise at least one of a source/destination synthesizer arranged to generate at least one of a fabricated source address and a fabricated destination address, an encryptor arranged to encrypt the forged data traffic before transmitting the forged data traffic to the external communication device.

In the system, the forged data traffic can comprise a fabricated source address or a fabricated destination address. The forged data traffic can comprise at least one of a fabricated source address, a fabricated destination address and synthesized payload content data. The forged data traffic can comprise encrypted data. The fabricated destination address can comprise a website on the Internet.

The traffic synthesizer can comprise one or more of a machine learning model, an activity monitor arranged to analyze the received data traffic to determine network activity or operational characteristics of the communication device, or a virtual private network (VPN) router arranged to send the transmitted forged data traffic to the external communication device through a virtual private network (VPN) tunnel. The machine learning model can be trained or updated based on an analysis of the received data traffic or the determined network activity or operational characteristics of said communication device. The VPN router can be arranged to divide the forged data traffic into two or more forged data traffic streams or send the forged data traffic streams through two or more virtual private network (VPN) tunnels. The two or more forged data traffic streams can include the received data from said communication device.

A non-transitory computer readable storage medium is provided storing computer program instructions that, when executed by a computing device, add an entropy factor to data traffic from a communication device to prevent fingerprinting or privacy leakage, wherein the computer program instructions can comprise the steps of receiving data traffic from a communication device connected to a network, parsing a device identification value for the communication device from the received data traffic and determining at least one of (i) a data transmission rate based on a first portion of the device identification value, (ii) a number of destinations based on a second portion of the device identification value, and (iii) a data payload size based on a third portion of the device identification value. The computer program instructions can comprise the steps of generating forged data traffic for the communication device based on the determined at least one of data transmission rate, number of destinations and data payload size, and transmitting the forged data traffic to an external communication device that is located outside the network. The forged data traffic can add an entropy factor to the data traffic from said communication device connected to the network.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
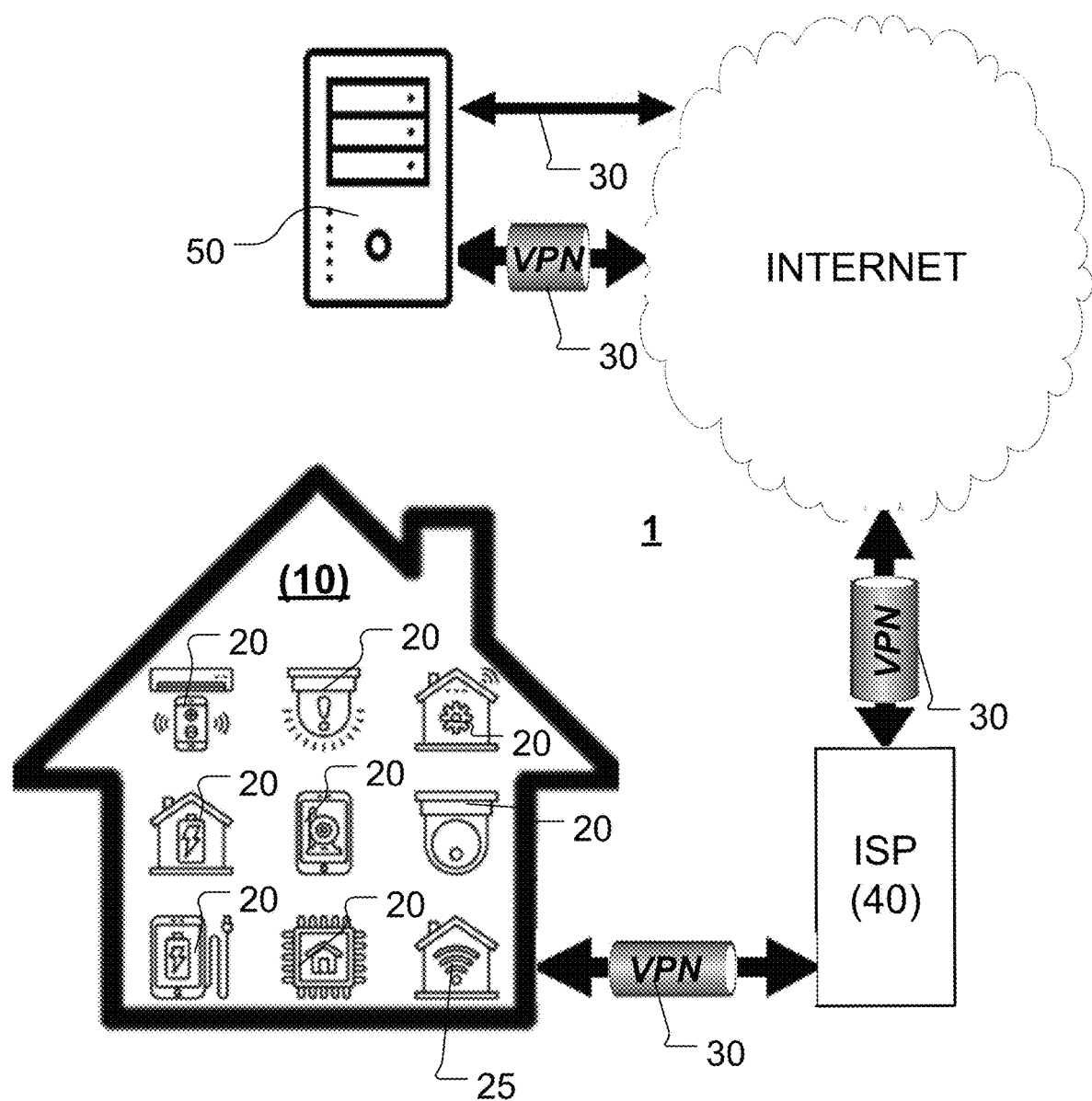
FIG. 1 shows a non-limiting example of a user environment provided with the technology solution, according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as to not unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Since its birth, the Internet has changed people's lives in many ways, including how they communicate, exchange information, transact business, or learn. With the dissemination of the Internet into homes, businesses, schools, government offices and individuals' hands (for example, through portable communication devices such as smart phones or tablets), large numbers and types of communication devices are being connected to the Internet. Internet-of-Things (IoT) devices make up a large portion of the growing number of communication devices that are being connect to the Internet.

IoT devices can include computing devices that equipped with unique identifiers (UIDs) and an ability to transfer data over a network without requiring human-to-human or human-to-computer interaction. IoT devices frequently include single purpose devices that can be connected to the Internet and that can be vulnerable to security breaches by third parties who can monitor data traffic to/from the IoT devices and learn information about a user's online and offline activities on the Internet, as well as take control of the IoT devices to monitor users in their homes, offices, or other areas. The information can then be data mined for business intelligence, marketing, or other information-based activities.

IoT devices are frequently used to automate or control appliances or equipment, such as, for example, household appliances, business appliances, business equipment, shipping equipment, or manufacturing equipment. One of the many reasons for the popularity of IoT devices is their ability to provide a smarter, more cost-efficient and effective way of monitoring, managing or controlling computing devices, mechanical or digital machines or devices, objects or animals. IoT devices are part of a larger concept of home and business automation that is evolving in the form of smart homes or businesses, or wireless sensor networks (WSN), including monitoring, managing or controlling such things as, for example, lighting, heating, air conditioning, ventilation, entertainment systems, security systems, healthcare devices and household appliances.

As their popularity grows and IoT devices become pervasive globally, privacy and security issues relating to IoT devices are taking on greater importance. While IoT devices can immensely improve the lives of individuals, privacy and security threats related to the use of the devices is enormous. Many IoT devices have severe operational limitations, including, for example, limited computational power, that make them unable to directly use basic security measures such as firewalls, encryption, or access restrictions. The low price and consumer focus of many IoT devices makes robust security patching systems uncommon. IoT devices can share some of the same or similar technical security concerns as those relating to other types of communication devices, such as, for example, servers, workstations or smartphones. Some examples of the technical security concerns include weak authentication, forgetting to change default credentials, unencrypted messages sent between devices, SQL injections and poor handling of security updates.

IoT devices can have access to new areas of data, and can often control physical devices, thereby allowing certain types of privacy intrusions to occur, such as, for example, through control of IoT devices in household or business appliances that can be used by unscrupulous individuals to spy on people or activities in their homes or offices. The appliances can include, for example, security cameras, doorbell cameras, nanny-cams, smartphones, laptops, televisions, kitchen appliances, thermostats, motion sensors, heart pacemakers, insulin pumps, implantable cardioverter defibrillators, garage door openers, automobiles or any other device that may be capable of sensing, detecting, monitoring, measuring or recording animals or animal activities.

Poorly secured IoT devices can be subverted to attack other communication devices. For example, in 2016, a distributed denial of service attack powered by IoT devices running the Mirai malware took down a DNS (domain name server) provider and major web sites. The Mirai malware infected hundreds of thousands of IoT devices, primarily targeting IoT devices such as, for example, digital video recorders (DVRs), Internet Protocol (IP) cameras, routers and printers. These sorts of attacks have caused security experts to view IoT devices as a real threat to Internet services.

Encryption can be used to secure data transmission to and from IoT devices. However, encryption can be inadequate to prevent against user monitoring, identification or privacy leakage. For instance, even where encryption is used, metadata in data traffic flowing to or from IoT devices can be passively analyzed to obtain user and device fingerprinting through a variety of available techniques used by, for example, Internet service providers (ISPs), WiFi eavesdroppers, or surveillance entities. Even though content in data traffic may not be accessible, information such as, for example, Domain Name System (DNS) queries, traffic rates, and data traffic characteristic or patterns can be monitored to identify IoT devices and their activities.

There exists an urgent unmet need for a technology solution that can provide secure data transmission for IoT devices and other communication devices while preventing privacy leakage or identification of the communication devices (including IoT devices) or their users. This disclosure provides a technology solution that meets this urgent need, including a method, system and computer program for preventing privacy leakage or identification of communication devices such as IoT devices, or their users. The technology solution can conceal the identity and activities of a communication device, such as, for example, an IoT device, from being discernible from other types of communication devices, such as, for example, a workstation, a desktop computer, a laptop computer, a tablet computer, or any other type of communication device. The technology solution can add an entropy factor to data traffic, including IoT traffic, to prevent analysis of the traffic by passive analysis technologies.

The technology solution includes, among other things, routing all communication device traffic in a network, including, for example, IoT traffic in a local area network (LAN), through an entropy appliance 25 (discussed below), which can forge and route data traffic through one or more communication links, including communication links that include one or more virtual private networks (VPNs), to protect data traffic from passive analysis or fingerprinting. The technology solution can prevent passive analysis techniques from being able to: identify the source communication device such as, for example, IoT device; fingerprint the communication device or the network within which it is connected; identify the destination of the data traffic; or glean any other information that might reveal the identity or activities of the communication device or its operation, or the network within which the communication device is connected based on an analysis of the data traffic that is output from the communication device or network. The technology solution can forge and/or route data traffic through multiple VPNs, thereby introducing an entropy factor that further obscures the identity or operation of the communication device or network.

FIG. 1 shows a non-limiting example of a user environment 1 provided with the technology solution, according to the principles of the disclosure. The user environment 1 can include a local area network (LAN) 10 having one or more communication devices 20 and an entropy appliance 25. The LAN 10 can include a smart LAN or a wireless sensor network (WSN). The user environment 1 can include the Internet. The user environment 1 can include an Internet Service Provider (ISP) server 40. The LAN 10 can be connected to the Internet through the ISP server 40. Each communication device 20 can be connected to the entropy appliance 25 by a communication link (not shown). The entropy appliance 25 (in the LAN 10) and ISP server 40 can be connected via a communication link 30.

The user environment 1 can include a Virtual Private Network (VPN) server 50. The entropy appliance 25 or ISP server 40 can be connected to the VPN server 50 via one or more communication links 30.

The communication device 20 can include an IoT device. The communication device 20 can include a computing device, a computing resource, a sensor, or hardware that is configured to measure, monitor, log, collect, transmit or receive data or instructions from the surrounding or nearby environment. The communication device 20 can be configured to collect and transmit information about a user's offline activities, including offline activities on the Internet. The communication device 20 can include encryption technology, advanced access controls or security measures and controls.

The entropy appliance 25 can tunnel data traffic from the communication devices 20 through one or more VPNs, which can be tunneled to the ISP server 40. The ISP server 40 can forward the VPN tunneled traffic to the VPN server 50 via one or more communication links 30, which can include one or more communication links in the Internet. The VPN server 50 can be connected to the Internet via one or more communication links 30.

The VPN tunnels can include a Layer 2 VPN or a Layer 3 VPN. The Layer 2 VPN can include a Layer 2 Tunneling Protocol (L2TP) or a Data Link Layer Protocol in the Open Systems Interconnection (OSI) reference model. The Layer 3 VPN can include a Layer 3 OSI reference model VPN. The VPN can include a Multiprotocol Label Switching (MPLS) VPN that uses, for example, Border Gateway Protocol (BGP) or multiprotocol BGP (MP-BGP) to distribute VPN-related information.

The entropy appliance 25 can be arranged to function as a hub in a hub-and-spoke configuration, where each spoke can include a unique communication device 20 that transmits or receives data traffic via the entropy appliance 25. The entropy appliance 25 can be configured to route all data traffic from the communication devices 20 in the LAN 10 over one or more communication links, which can include one or more VPN tunnels. The entropy appliance 25 can be configured to monitor, log and learn operational characteristics and activities for each communication device 20, including all network activities and operational characteristics. The operational characteristics can include data traffic transmission patterns, such as, for example, traffic rate, amount of traffic, type of traffic, type of data content, traffic source or traffic destination.

The entropy appliance 25 can be arranged to forge data traffic for each communication device 20 to generate an entropy factor to a portion or all data traffic emanating from the entropy appliance 25. The forged data traffic can include synthetic data that can be injected as filler data in the forged data traffic or packetized and transmitted as forged data traffic from a fabricated communication device. In the latter instance, a passive analyzer would likely identify the forged data traffic as emanating from the fabricated communication device, which does not exist in reality but, instead, is fabricated to confuse passive analysis technologies. The forged data traffic can provide an entropy factor that reduces or eliminates any chance of the communication device 20 or the LAN 10 being identified or monitored through technologies such as fingerprinting or other passive analysis technologies. The forged data traffic can be generated or shaped by the entropy appliance 25 based on learned network activities and operational characteristics for each communication device 20. The forged data traffic can be generated by the entropy appliance 25 carrying out a data traffic forging process 200 (shown in FIG. 5) and/or traffic randomization process 300 (shown in FIG. 6).

The entropy appliance 25 can be arranged to forge data traffic for one or more communication devices 20 or to fabricate a communication device that does not exist in actuality, by, for example, identifying itself as one or more sources of the data traffic. For instance, the entropy appliance 25 can mask itself as one or more IoT devices. The entropy appliance 25 can forge data traffic for a communication device 20 by normalizing data traffic based on learned network activities or operational characteristics for the communication device. The entropy appliance 25 can obscure the activity level for each communication device 20 through data traffic forging such that a third party device (not shown) or passive analysis technology cannot identify the communication device 20, the device's activities or operational characteristics, or discern between different communication devices 20 based on the forged data traffic. The forged data traffic can prevent passive analysis technologies from discerning between active and less active communication devices 20, or between IoT devices and non-IoT devices in the LAN 10.

The entropy appliance 25 can be arranged to receive data traffic from a communication device 20 and forge data traffic before transmitting the forged data traffic to the ISP server 40, which includes the actual data received from the communication device 20. The entropy appliance 25 can forge data traffic for the communication device 20 by, for example, generating random or normalized data traffic. The entropy appliance 25 can route and transmit the forged data traffic to remote destinations, such as, for example, communication devices (not shown) located anywhere in the world and connected through a network, including, for example, the Internet.

The entropy appliance 25 can, by means of data traffic forging, add extra levels of protection for data traffic between communication devices 20 and the Internet or ISP server 40 by concealing actual data traffic, traffic characteristics and traffic patterns. The data traffic forging can prevent passive analyzers (not shown) from being able to analyze and determine the types of communication devices 20 in the LAN 10, the sources or destinations for the data traffic entering or exiting the LAN 10, or the activity levels of the communication devices 20 or their users in the LAN 10. The forged data traffic can conceal actual data traffic from passive analysis technologies. The entropy appliance 25 can be arranged to route forged data traffic through multiple VPNs to add randomness for added levels of protection, which can conceal data traffic, data traffic characteristics and data traffic patterns from the most complex and lengthy analysis processes known to those skilled in the art.

The entropy appliance 25 can be arranged to receive data traffic from a communication device 20 and forge data traffic to match data traffic from another type of communication device (such as, for example, a non-IoT device), which can then be transmitted to remote destinations, including fabricated destinations such as, for example, search engines, news websites, or other accessible communication devices (not shown) on the Internet. The entropy appliance 25 can forge data traffic by, for example, generating and transmitting queries to known websites such as reputable search engines or news websites, and embedding in the forged data traffic the actual data traffic received from the communication device 20. The actual data traffic can be randomly or intermittently injected into the forged data traffic. As a result, the forged data traffic can conceal from passive analysis technologies the type of communication device 20 (for example, whether it is an IoT device), the activity levels of the communication device 20, or data traffic patterns for the communication device 20.

Figure 2:
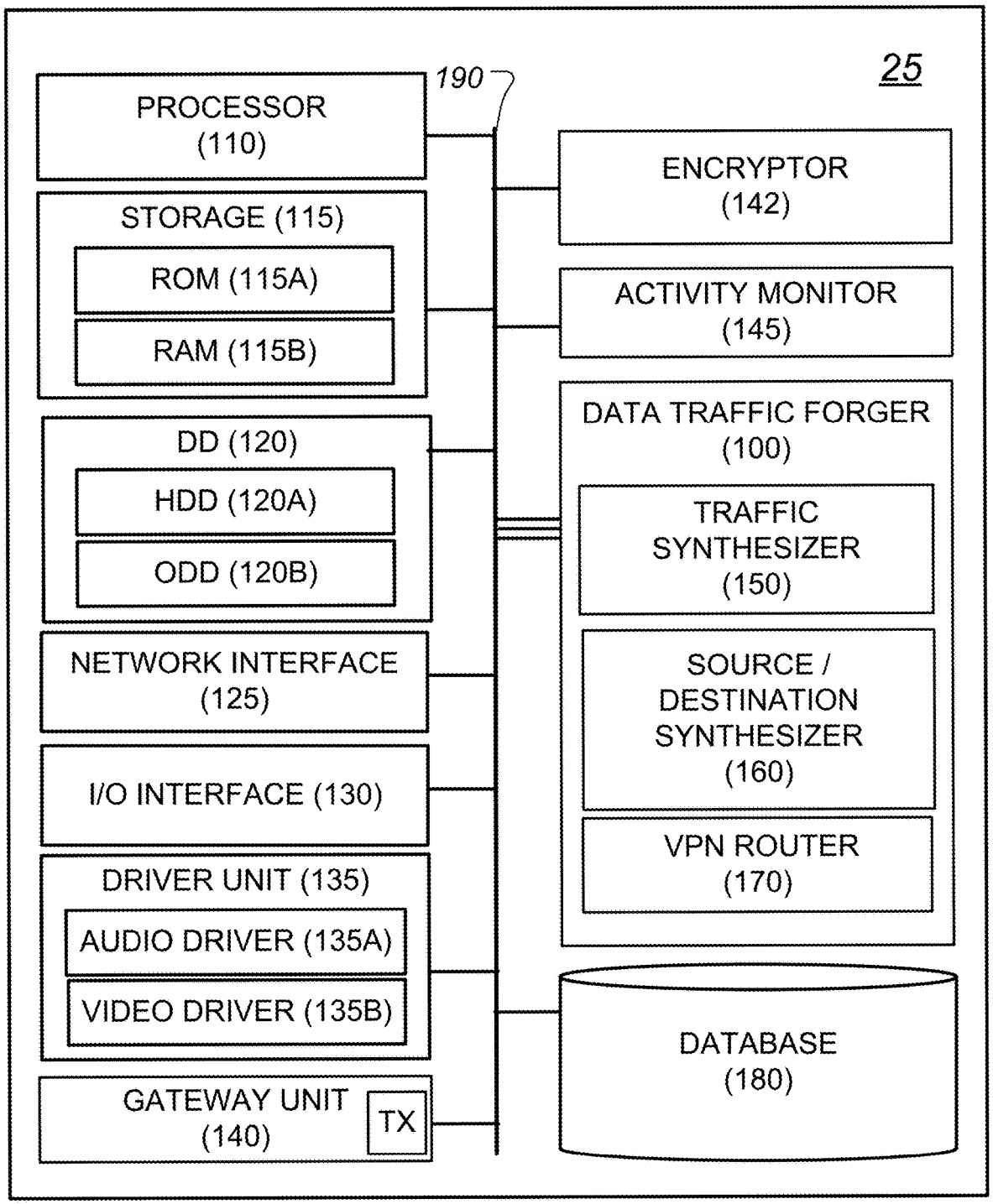
FIG. 2 shows a non-limiting embodiment of an entropy appliance that is constructed according to the principles of the disclosure.

FIG. 2 shows a non-limiting embodiment of the entropy appliance 25, constructed according to the principles of the disclosure. The entropy appliance 25 can include a processor 110, a storage 115, a disk drive (DD) 120, a network interface 125, an input/output (I/O) interface 130, a driver unit 135, a gateway unit 140, an encryptor 142, an activity monitor 145, a data traffic forger 100 and a database 180. The encryptor 142 can encrypt data traffic, for example, using an encryption key. The data traffic forger 100 can include a traffic synthesizer 150, a source/destination (S/D) synthesizer 160 and/or a virtual private network (VPN) router 170. The entropy appliance 25 can include a system bus 190, which can be communicatively linked to each of the components 100 to 180 in the entropy appliance 25 by a communication link.

The entropy appliance 25 can include one or more additional routers (not shown). The router(s) can be included in the gateway unit 140, or as one or more separate modules or communication devices.

The entropy appliance 25 can include a transceiver (TX), including a transmitter and a receiver. The transceiver TX can be included in the gateway unit 140, or as one or more separate modules or communication devices.

Any one or more of the components 115 to 180 in the entropy appliance 25 can include a device or a module that is separate from the processor 110, as seen in FIG. 2, or integrated or integrateable in a device(s) such as the processor 110. The entropy appliance 25 can include a sound generation device (not shown), such as, for example, a speaker, a sound pickup device (not shown), such as, for example, a microphone, or a display device (not shown), such as, for example, a light emitting diode (LED) display or a liquid crystal display (LCD). The entropy appliance 25 can include a voice command device (not shown), a smart voice recognition (not shown) or a voice activated device (not shown).

Any one or more of the data traffic forger 100, activity monitor 145, traffic synthesizer 150, S/D synthesizer 160 or VPN router 170 can be implemented as a computing device or a machine intelligence platform. In a nonlimiting embodiment, the activity monitor 145, traffic synthesizer 150, S/D synthesizer 160 and VPN router 170 can be implemented as one or more machine intelligence platforms in one or more computing devices. The machine intelligence platform can include machine learning such as, for example, supervised learning, unsupervised learning, semi-supervised learning, or reinforcement learning. The machine learning can include, for example, nearest neighbor, naive Bayes, decision trees, linear regression, support vector machines (SVM), neural networks, deep neural networks, k-means clustering, Q-learning, temporal difference (TD), deep adversarial networks, or fuzzy logic.

The system bus 190 can include any of several types of bus structures that can further interconnect to a memory bus (with or without a memory controller), a peripheral bus, and a local bus using any of a variety of commercially available bus architectures. The system bus 190 can include a backbone.

The processor 110 can include any of various commercially available graphic processing unit devices. Dual microprocessors and other multi-processor architectures can be included in the processor 110. The processor 110 can include a central processing unit (CPU) or a graphic processing unit (GPU). The processor 110 includes a computing device.

The entropy appliance 25 can include a computer-readable medium that can hold executable or interpretable computer code or instructions that, when executed by the processor 110 or one or more of the other components (e.g., devices or modules) in the entropy appliance 25, causes the steps, processes or methods in this disclosure to be carried out. The computer-readable medium can be provided in the storage 115 or DD 120. The computer readable medium can include sections of computer code that, when executed by one or more components in the entropy appliance 25 cause the entropy appliance 25 to carry out the data traffic forging process 200 (shown in FIG. 5) and/or the traffic randomization process 300 (shown in FIG. 6), as well as all other processes or process steps described or contemplated in this disclosure.

The storage 115 can include a read only memory (ROM) 115A and a random-access memory (RAM) 115B. A basic input/output system (BIOS) can be stored in the non-volatile memory 115A, which can include, for example, a ROM, an EPROM, or an EEPROM. The BIOS can contain the basic routines that help to transfer information between components in the entropy appliance 25, such as during start-up. The RAM 115B can include a high-speed RAM such as static RAM for caching data.

The DD 120 can include a hard disk drive (HDD) 120A and an optical disk drive (ODD) 120B. The HDD 120A can include, for example, an enhanced integrated drive electronics (EIDE) drive, or a serial advanced technology attachments (SATA) drive. The ODD 120B can include, for example, a read/write from/to a CD-ROM disk (not shown), or, read from or write to other high capacity optical media such as a digital versatile disc (DVD). The HDD 120A or ODD 120B can be configured for external use in a suitable chassis (not shown). The DD 120 can be connected to the system bus 180 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage 115 or DD 120, including computer-readable media, can provide nonvolatile storage of data, data structures, and computer-executable instructions. The storage 115 or DD 120 can accommodate the storage of any data in a suitable digital format. The storage 115 or DD 120 can include one or more apps that are used to execute aspects of the architecture described herein.

One or more program modules can be stored in the storage 115 or DD 120, including an operating system (not shown), one or more application programs (not shown), one or more application program interfaces (APIs), other program modules (not shown), and program data (not shown). The APIs can include, for example, web APIs, simple object access protocol (SOAP) APIs, remote procedure call (RPC) APIs, representation state transfer (REST) APIs, or other utilities or services APIs. Any of the operating system, application programs, program modules, and program data can be cached in the RAM 115B as executable sections of computer code.

The network interface 125 can be connected to a network such as the LAN 10 or the Internet (shown in FIG. 1). The network interface 125 can be connected to one or more communication devices 20 or the ISP server 40. The network interface 125 can include a wired or a wireless communication network interface (not shown) or a modem (not shown). When used in the LAN 10, the entropy appliance 25 can be connected to the LAN 10 through the wired or wireless communication network interface; and, when used in a wide area network (WAN), the entropy appliance 25 can be connected to the WAN network through the modem. The modem (not shown) can be internal or external and wired or wireless. The modem can be connected to the system bus 190 via, for example, a serial port interface (not shown).

The network interface 125 can include a network router interface (not shown). The network router interface (not shown) can be configured to communicate with the communication devices 20. The network router interface (not shown) can be configured to communicate with, for example, a customer edge (CE) router (not shown) or a provider edge (PE) router (not shown) in IP/MPLS (Internet Protocol/Multiprotocol Label Switching) network applications. The network router interface (not shown) can be configured to communicate with an API in the entropy appliance 25, such as, for example, an XML API or an API compatible with Extensible Markup Language (XML) processing that can support available transport layers such as terminal-based protocols, including, for example, Telnet, Secure Shell (SSH), dedicated-TCP connection, or Secure Sockets Layer (SSL) dedicated TCP connection. The API can configure the CE router (not shown) or request information about configuration, management or operation of the CE router (not shown). The API can facilitate building a custom end-user interface for configuration and information retrieval and display. The API can supply a CLI (Common Language Infrastructure) or configuration file to the CE router (not shown).

The API can provide an interface to the CE router (not shown) that can be used by, for example, the entropy appliance 25 to develop client applications and scripts (for example, a Perl script) to manage or monitor the CE router (not shown). The interface can include an XML interface that can be specified by XML schemas. The API can exchange formatted request or response streams for configuring or monitoring the CE router (not shown). The CE router (not shown) can process a request and send the request to the entropy appliance 25. The entropy appliance 25 can include a secure router (not shown). The entropy appliance 25 can encode an instruction in, for example, XML API tags, which can be received by the CE router (not shown) to update or change the router configuration, including terminating transmission of data packets. The communication signal from the entropy appliance 25 can begin, for example, with an XML declaration tag followed by a response tag, one or more operation type tags, and a result summary tag with an error count. A response can be received from the CE router (not shown) containing operation tags for each supported operation type.

The API can provide an interface to each communication device 20 that can be used by the entropy appliance 25 to develop client applications and scripts to manage or monitor each communication device 20, including all data traffic originating from or destined to the communication device. The interface can include an XML interface that can be specified by XML schemas. The API can exchange formatted request or response streams for configuring or monitoring the communication device 20. The communication device 20 can process a request and send the request to the entropy appliance 25.

The (I/O) interface 130 can receive commands and data from an operator. The I/O interface 130 can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 130 as instruction and data signals via the bus 190 to any component in the entropy appliance 25.

The driver unit 135 can include an audio driver 135A and a video driver 135B. The audio driver 135A can include a sound card, a sound driver (not shown), an interactive voice response (IVR) unit, or any other device necessary to render a sound signal on a sound production device (not shown), such as for example, a speaker (not shown). The video driver 135B can include a video card (not shown), a graphics driver (not shown), a video adaptor (not shown), or any other device necessary to render an image signal on a display device (not shown).

The gateway unit 140 can include a communication device such as, for example a Raspberry Pi single-board or multi-board computing device. The gateway unit 140 can include a router (not shown). The gateway unit 140 can connect to each of the communication devices 20 via, for example, the network interface 125, I/O interface 130 or one or more communication links. The gateway unit 140 can capture all data traffic originating from or destined to the communication devices 20.

The gateway unit 140 can include a Secure Web Gateway (SWG) that can enforce a policy and filter data traffic in real-time. The gateway unit 140 can include a Web Server Gateway Interface (WSGI) that can forward requests to web applications or frameworks.

The activity monitor 145 can include a packet analyzer or a suite of packet analyzers that can check and monitor data traffic from (or to) all communication devices 20 in the LAN 10. The activity monitor 145 can check and monitor data traffic from (or to) the communications devices 20 in parallel and in real-time. The activity monitor 145 can include a computing resource or a computing device, such as, for example, a packet capture appliance, that can intercept and log traffic that passes through the entropy appliance 25. The activity monitor 145 can capture each data packet as it enters the entropy appliance 25, including all data packets destined to or sourced from the communication devices 20 in the LAN 10 (shown in FIG. 1). The activity monitor 145 can decode each data packet to analyze and log the raw data, including the data content and values of fields in the data packet, as well as packet header data, including, for example, source address and destination address.

The activity monitor 145 can include a packet analyzer, such as, for example, TCPDump, Wireshark, TCPTrace, EtherApe, Ngrep or any other computing device or computing resource that can analyze data packets received from (or destined to) the communication devices 20. The activity monitor 145 can analyze data traffic using, for example, Python or any other similar programming language. The activity monitor 145 can analyze the data packets and identify and log login identification information (login IDs), passwords, URLs (Uniform Resource Locators), Internet Protocol (IP) addresses, data content, websites accessed, or any other information that can be determined from analyzing the data packets from (or destined to) the communication devices 20.

The activity monitor 145 can analyze and log network problems for the LAN 10, detect network intrusion attempts, isolate exploited communication devices 20, monitor LAN 10 bandwidth utilization, gather and report data traffic statistics for each communication device 20, or identify suspect content in data traffic.

The activity monitor 145 can check, monitor and log header or payload data, including for example, URL parameters or HTTP (Hypertext Transfer Protocol) parameters intended for a web server (not shown). The activity monitor 145 can check, monitor and log URL parameters such as, for example, destination address, source address, or search queries. The activity monitor 145 can check, monitor and log HTTP parameters, such as, for example, GET, HEAD, POST, PUT, DELETE, TRACE, CONNECT, OPTIONS, or PATCH. The activity monitor 145 can store the results of the analysis, including log data, in the storage 115, DD 120, or database 180. Analysis results data, including log data, can be stored over an extended period of time for each communication device 20 in the LAN 10, including for the lifetime of a communication device 20.

The analysis results from the activity monitor 145 can be used to train and update parameters in a machine learning model for each communication device 20 and/or a machine learning model for the overall LAN 10. The activity monitor 145 can identify the communication devices 20 and access or download training datasets for the communication devices 20 or the LAN 10 to train the machine learning model (for example, neural network) using, for example, a supervised learning method, such as, for example, gradient descent, stochastic gradient descent, or any other learning method that is appropriate for the machine learning model(s) installed in the entropy appliance 25.

The machine learning model(s) can be trained using multiple datasets, as is known by those skilled in the art, including, for example, a training dataset, a test dataset and a validation dataset. The model(s) can be trained and periodically or continuously updated to accurately predict data traffic, traffic characteristics and traffic patterns for each communication device 20, as well as the entire LAN 10. Model parameters can be updated on an ongoing basis based on analysis results from the activity monitor 145.

The traffic synthesizer 150, S/D synthesizer 160 and/or VPN router 170 can be combined into a single device or module, or configured as a suite of separate devices or modules (as shown in FIG. 2).

The traffic synthesizer 150 can generate and inject synthetic data into the data traffic stream for any one or more of the communication devices 20. The traffic synthesizer 150 can generate and inject the synthetic data for a communication device 20 based on that device's operational characteristics, activity history, including network activity, and/or predicted network activity, which can be predicted by the machine learning model. The traffic synthesizer 150 can generate and inject data so that resultant data traffic is independent of actual device or user behavior, such as, for example, network usage patterns or characteristics. For instance, the traffic synthesizer 150 can generate and inject synthetic data for the particular communication device 20 such that a constant traffic rate appears at the output of the entropy appliance 25 for the communication device, thereby concealing the type or identity of the device or its user, including when the particular communication device 20 is idle.

Figure 3:
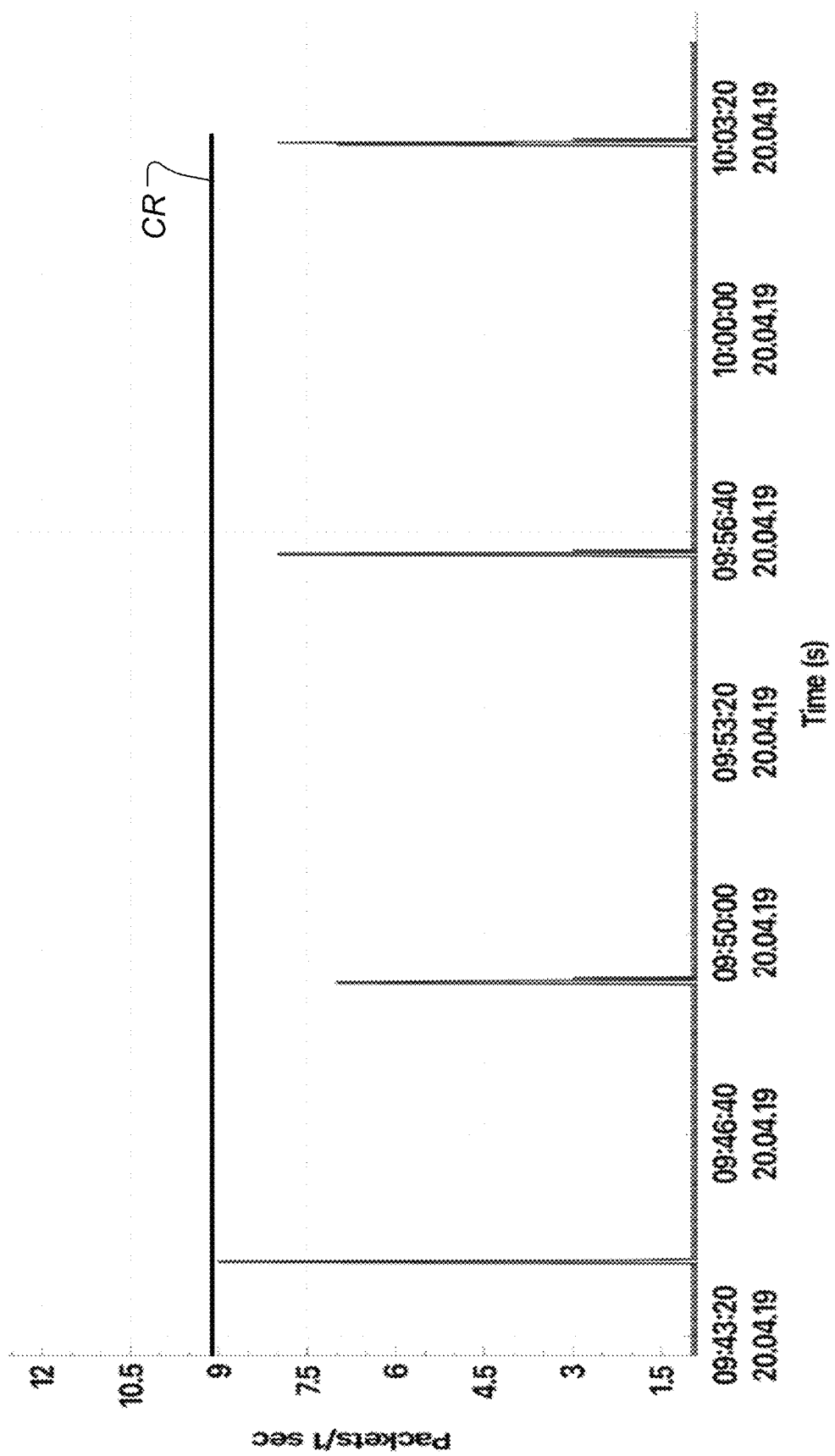
FIG. 3 shows a nonlimiting example of traffic rate data for a communication device that includes a smart doorbell IoT device.

FIG. 3 shows traffic rate data for a communication device 20 that includes a smart doorbell IoT device. In this nonlimiting example, the doorbell IoT device was triggered four times over a twenty-minute period, resulting in four separate data traffic spikes with data packet rates ranging from about seven (7) data packets-per-second to nearly nine (9) data packets-per-second at the timestamps indicated in FIG. 3. In a nonlimiting embodiment, the traffic synthesizer 150 can generate and inject synthetic data to provide a constant data traffic rate (CR), thereby obscuring the actual traffic rate for the communication device 20 comprising the smart doorbell IoT device. The synthetic data can include randomly generated data.

Figure 4:
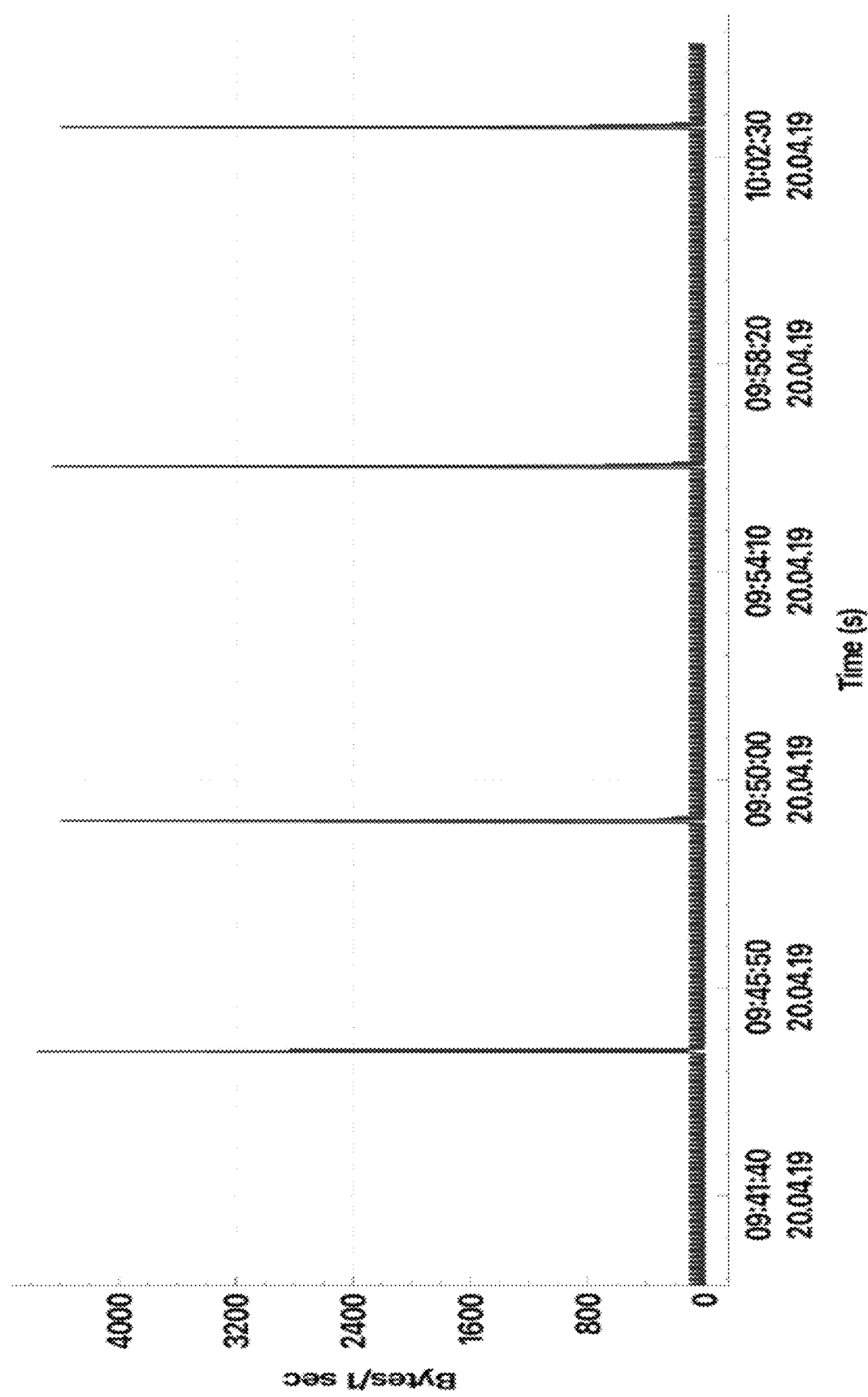
FIG. 4 shows a nonlimiting embodiment in which the entropy appliance in FIG. 2 can generate and inject data for the IoT device.

FIG. 4 shows another nonlimiting embodiment in which the traffic synthesizer 150 can generate and inject data for the communication device 20 corresponding to FIG. 3, which includes the smart doorbell IoT device, to provide normalized data packet sizes. The resultant forged data traffic obscures the actual data traffic rate by generating data traffic of equal size data packets, thereby making it difficult or impossible to determine the actual data traffic rates from the resultant forged data traffic output by the entropy appliance 25.

The traffic synthesizer 150 can generate fabricated destination addresses, or it can receive the fabricated destination addresses from the S/D synthesizer 160. The traffic synthesizer 150 can randomize the destination addresses for the forged traffic data to further obscure the traffic. For example, the traffic synthesizer 150 can include a URL or IP destination address of a search engine on a destination host communication device (not shown) so that the source communication device 20 might appear to a passive analyzer as a non-IoT device, thereby obscuring the identity of the communication device.

Since most of IoT devices tend to be events-based or function-centric, they are vulnerable to identification through analysis of traffic rate data transmitted to/from the devices. For example, communication devices 20 that include IoT devices such as cameras or motion sensors tend to have frequent or continuous events (for example, real-time monitoring by camera) that generate large amounts of network traffic. However, communication devices 20 that include IoT devices such as doorbells, glucose meters or smart plugs tend to have infrequent or sporadic events that generate intermittent or little network traffic. The traffic synthesizer 150 can obscure such IoT devices from identification by generating and injecting synthetic data to make the data traffic constant, variable or random so that the IoT device is unidentifiable using, for example, passive analysis technologies.

The traffic synthesizer 150 can forge an entirely new data stream that can be transmitted from the entropy appliance 25 as forged data traffic from a fabricated (or nonexistent) communication device in the LAN 10. For example, the traffic synthesizer 150 can generate header data that includes a fabricated source address, fabricated destination address or other identifying information, as well as fabricated payload data. The traffic synthesizer 150 can interact with the S/D synthesizer 160 to receive the fabricated source and destination addresses. The forged data traffic can include encrypted data. The encrypted data can include randomly generated payload data.

The S/D synthesizer 160, which can be formed as a single device or module with the traffic synthesizer 150 or provided separately, can fabricate a source IP address or a destination URL. For instance, the S/D synthesizer 160 can identify a commonly used URL, such as, for example, a search engine URL, a news website URL, or any other website commonly accessed by the general public. The S/D synthesizer 160 can learn network activity for non-IoT communication devices 20 in the LAN 10 over time and identify destination addresses or URLs used by such devices. The S/D synthesizer 160 can generate a fabricated destination address by, for example, crawling the WWW and determining popular URLs. The fabricated destination address (or URL, such as, for example, <www.yahoo.com>) can be forwarded to the traffic synthesizer 150 to be injected into the packet header of fabricated data traffic, which can be sent by the entropy appliance 25 to the ISP server 40 (shown in FIG. 1). The S/D synthesizer 160 can change the fabricated destination URL for added obscurity or concealment from passive analyzers.

The VPN router 170 can create one or more VPN connections and route data traffic for the LAN 10 through the VPN(s). The VPN router 170 can route data traffic for a particular communication device 20 through multiple (for example, two or more) VPNs. The VPN router 170 can include or access, for example, a look-up-table (LUT) (not shown) or a random number generator (not shown) to match the data traffic for the communication device 20 to the VPNs, thereby dividing the data traffic and forwarding it through the multiple VPNs according to the LUT or a random routing sequence from the random number generator. At the VPN server 50 (shown in FIG. 1), the multi-routed data packets can be recombined by executing an inverse of the LUT or random routing sequence.

The VPN router 170 can include an Open Shortest Path First (OSPF) topology and process for the LAN 10 (shown in FIG. 1) that can work with a link state routing (LSR) algorithm and support a Classless Inter-Domain Routing (CIDR) addressing model and a BGP (Boarder Gateway Protocol) table and process to exchange routing and reachability information among autonomous systems (AS) in the user environment 1 (shown in FIG. 1), including CE routers (not shown) in IP/MPLS network applications. The VPN router 170 can generate and maintain information that can allow CE routers (not shown) in IP/MPLS network applications to make routing decisions based on paths, network policies or rule-sets. The VPN router 170 can include, for example, Interior or internal Border Gateway Protocol (IBGP). The VPN router 170 can include BGP extended community attributes to be used for a particular GM or group SA. The VPN router 170 can include IP routing tables and IP forwarding tables, including VRF tables. The routing tables can include lists of routes to particular network destinations, and in some cases, metrics (distances) associated with those routes. The routing tables can contain information about the topology of the LAN 10.

The VPN router 170 can be configured to provide instantaneous large-scale any-to-any IP connectivity using, for example, a group IPsec security paradigm, and taking of underlying IP VPN routing infrastructure in the user environment 1 without any need for an overlay routing control plane. The VPN router 170 can facilitate seamless integration with multicast infrastructures without the multicast replication issues that might be seen in traditional tunnel-based IPsec solutions. The VPN router 170 can also facilitate preservation of IP source and destination addresses during the IPsec encryption and encapsulation process.

The VPN router 170 can create and maintain a GETVPN control plane. The VPN router 160 can define and provide all encryption policies, including interesting traffic, encryption protocols, security association, and rekey timers. The VPN router 170 can push down encryption policies to CE routers (not shown) at time of registration. The CE router (not shown) can be included in the VPN server 50 (shown in FIG. 1). The encryption policy can be used by the CE router (not shown) to encrypt all traffic leaving the CE router crypto interface. The CE router (not shown) can be responsible for actual encryption and decryption. The CE router (not shown) can be configured with, for example, IKE parameters and key group SA information and, based on downloaded policies, the CE router can decide whether to encrypt or decrypt traffic and what key to use.

The database 180 can include a database management system (DBMS) (not shown), file-based storage system or any storage medium which can receive and process queries in the entropy appliance 25 to locate and retrieve data from the database 180. The database 180 can include a DBMS such as, for example, SQL, MySQL, Oracle, Access, or Unix. The database 180 can include a relational database. The database 180 can include the computing resource base and communication device base for the LAN 10 (shown in FIG. 1), including all communication devices 20 or computing resources in the LAN 10. The database 180 can store IP addresses, device activity logs, user activity logs, network activity logs, and device information for each communication device 20 in the LAN 10, including all computing resources in the communication devices 20 or LAN 10.

Figure 5:
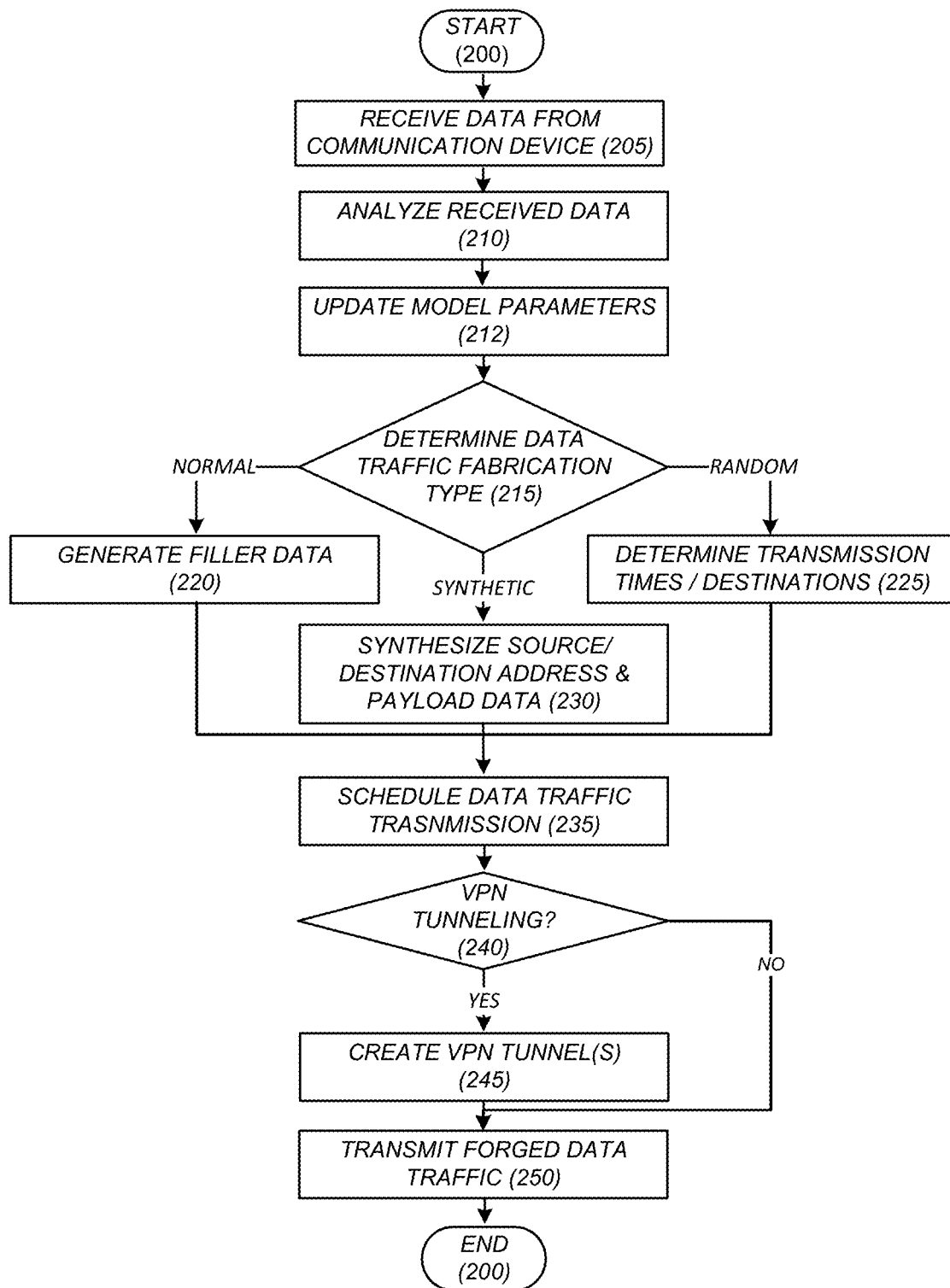
FIG. 5 shows a nonlimiting embodiment of a data traffic fabrication process, according to the principles of the disclosure.

FIG. 5 shows a nonlimiting embodiment of the data traffic fabrication process 200, according to the principles of the disclosure. Referring to FIGS. 1, 2 and 5, the entropy appliance 25 can receive data from one or more of the communication devices 20 (Step 205). The entropy appliance 25 can store the received data in, for example, the storage 115. The activity monitor 145 can analyze the received data, as well as historical data for the communication device(s) 20 (Step 210). The activity monitor 145 can determine network activity and/or operational characteristics for the communication device(s) 20 based on historical data, which can be retrieved from, for example, the database 180. The results of the analysis can be forwarded to the machine learning model and model parameters updated based on the analysis, including analysis of the received data (Step 212).

The entropy appliance 25 can determine a data traffic fabrication type to be employed for obscuring the received data, including traffic normalization, traffic randomization and/or traffic synthesis (Step 215). The data traffic fabrication type can be determined by the machine learning model. The data traffic fabrication type can be determined based on historical network activity and operational characteristics for the communication device(s) from which the data was received (in Step 205) and/or the rest (or fewer than the rest) of the communication devices 20 in the LAN 10. For instance, the determination can be made by the machine learning model, which can predict the type(s) of data traffic fabrication to be employed to optimize concealment and entropy factor against passive analysis of the fabricated data traffic to glean information about actual data traffic. All or fewer than all of the data traffic fabrication types can be employed by the entropy appliance 25 in parallel or sequentially.

If a determination is made to employ traffic normalization (NORMAL at Step 215), then a maximum data packet rate, Byte rate or data packet size can be determined for the data based on, for example, historical network activity or operational characteristics of the communication device 20. Based on the determined data rate or size of data received from the communication device 20, filler data can be generated by the traffic synthesizer 150 and injected with the received data (in Step 205) to normalize the traffic data, as shown, for example, in the nonlimiting examples in FIG. 3 or 4. The actual and synthesized filler data can be placed in the queue for transmission by the entropy appliance 25 (Step 235). The filler data can include randomly generated data.

If a determination is made to employ traffic randomization (RANDOM at Step 215), then transmission times, source addresses and/or destination addresses can be determined (Step 225). The transmission times can be generated based on a random number generator (not shown) output value or any other transmission scheduling approach that adds an entropy factor to the data traffic. The destination address can be determined by the S/D destination synthesizer 160, which can include, for example, multiple destination addresses for the same data, a fabricated destination address or the destination address included in the packet header of the received data (in Step 205). The fabricated destination address can include, for example, a frequently visited website on the Internet, a search engine or any URL that is frequented by public users.

The source address can include a source address fabricated by the S/D synthesizer 160 such as, for example, where the source of the data traffic is to be obscured from detection by third party data analyzers (not shown).

Figure 6:
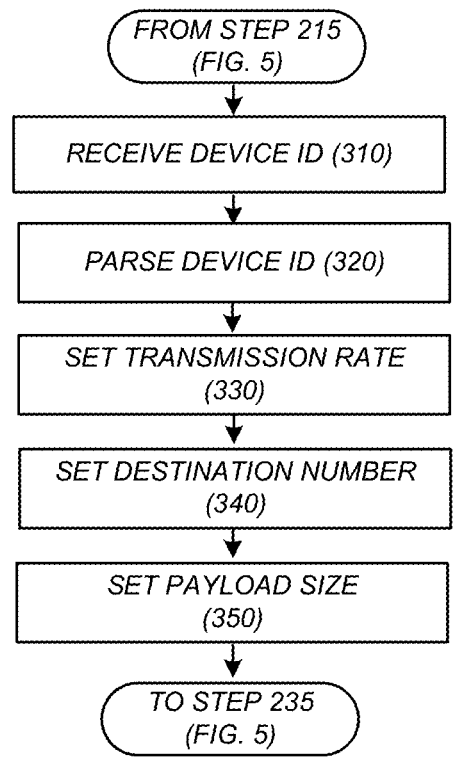
FIG. 6 shows a nonlimiting embodiment of data traffic randomization process, according to the principles of the disclosure.

According to a nonlimiting embodiment of the traffic randomization type, the transmission times can be determined (in Step 225) based on a device specific property, such as, for example, an identification number, a serial number or a Media Access Control (MAC) address of the communication device 20. FIG. 6 shows a nonlimiting embodiment of a traffic randomization process 300 that can be carried out to determine the transmission times and/or destinations (Step 225). As with all forged data traffic emanating from the entropy appliance 25, the randomized data traffic can be encrypted to prevent unintended visibility into the content included in the forged data traffic.

Referring to the nonlimiting process 300 shown in FIG. 6, the transmission times and/or destinations (for example, in Step 225, shown in FIG. 5) can be determined so as to add an entropy factor to the forged data traffic. A unique device identification number can be received from the communication device 20 (Step 310). The device identification can include, for example, a 12-digit (6 bytes or 48 bits) Media Access Control (MAC) address having a format MM-MM-MM-SS-SS-SS, where the leftmost 6 digits (3 bytes or 24 bits) MM-MM-MM identify the manufacturer (M) and the rightmost 6 digits SS-SS-SS identify the specific communication device 20 (S). The 6-digit prefix MM-MM-MM for an IoT doorbell camera device manufactured by NEST LABS can be, for example, "64-16-16," and the 6-digit device-specific value SS-SS-SS can include hexadecimal code values that identify the specific IoT device, as understood by those skilled in the art. Certain device manufacturers have been known to employ randomized MAC address generation in their devices, so as to prevent tracking. Such random generated MAC addresses can add an extra entropy factor to the data traffic.

The received device identification number (for example, MAC address) can be parsed into three separate portions, including a transmission rate determiner portion, a number of destinations determiner portion, and a payload determiner portion (Step 310). The transmission rate determiner portion can be used to determine the number of transmissions to be carried out for the forged data traffic (shown in FIG. 2) per unit of time (Step 330), such as, for example, per hour. The number of destinations determiner portion can be used to determine the number of destination addresses (for example, websites) to which to transmit the forged data traffic (Step 340). The destination addresses can be determined by the S/D synthesizer 160 (shown in FIG. 2), as discussed above. The payload determiner portion can be used to determine the size of the payload to be packetized and transmitted (Step 350). The randomized data traffic can then be scheduled for transmission (Step 235, shown in FIG. 5).

In a nonlimiting example that includes the device-specific MAC address SS-SS-SS having the hexadecimal value "04-03-38," the identification number (e.g., "04-03-38") can be converted to the corresponding decimal value (e.g., "04-03-56"), which can be parsed to the transmission rate determiner portion (e.g., "04"), number of destinations determiner portion (e.g., "03") and the payload determiner portion (e.g., "56"). The three portions "04," "03," and "56" can then be referenced to set four (4) data transmissions per hour to three (3) different websites, each having a payload of A×fifty-six (56) bytes, where A can be a positive integer greater than 0 that is generated by, for example, random number generator (not shown). This process can be enhanced to simulate real user interaction scenarios, such as, for example, opening a search engine, searching for a news website, and requesting the main or first article on the website. Such an approach can add an automated entropy factor to the data traffic, since the search results will change with each query or search engine, and the data content will vary from news website to news website.

Referring back to FIG. 5, if a determination is made to employ traffic synthesis (SYNTHETIC at Step 215), then one or more fabricated source address and one or more fabricated destination addresses can be determined by the S/D synthesizer 160 and filler payload data generated (Step 230). The payload data can include randomly generated data.

The normalized data, synthetic data and/or randomized data can be assembled and place in queue for transmission as forged data traffic (Step 235). The forged data traffic can be encrypted and packetized for transmission to, for example, the ISP server 40 (shown in FIG. 1). A determination can be made whether to transmit the forged data traffic over one or more VPNs (Step 240). If it is determined to transmit the forged data traffic over one or more VPNS (YES at Step 240), then a VPN tunnel(s) can be created (Step 245) and the forged data traffic transmitted (Step 250) to, for example, the ISP server 40 (shown in FIG. 1).

Forged data traffic for a single communication device 20 can be split and tunneled through two or more VPNs for an added entropy factor.

Forged data traffic for two or more communication devices 20 can be tunneled through two or more respective VPNs. The multiple streams of forged data traffic can be switched (for example, randomly or systematically) between the VPNs for an added entropy factor.

If, however, a determination is made not to tunnel the forged data traffic through a VPN (NO at Step 240), then the forged data traffic is transmitted via one or more communication links (Step 250) to, for example, the ISP server 40 (shown in FIG. 1).

While an unscrupulous individual or entity might use a passive analyzer (not shown) to analyze offline network traffic from the LAN 10 (shown in FIG. 1) in an attempt to identify the communication devices 20 in the LAN 10, by attempting to analyze the source, destination or overall activity of data traffic from the LAN 10, or the ISP 40 might use a passive analyzer to analyze the data traffic for marketing or research purposes, the technology solution provided in this disclosure remediates these types of risks by obscuring traffic data from identification or privacy leakage. By obscuring outgoing traffic data from the LAN 10, the technology solution can prevent fingerprinting techniques that might try and build blueprints of the communication devices 20 in the LAN 10 based on network traffic features such as request destination, packet number or size.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a bus or a network. The backbone can include an ethernet TCP/IP. The backbone can include a distributed backbone, a collapsed backbone, a parallel backbone or a serial backbone.

The term "communication device," as used in this disclosure, means any computing device, hardware, firmware, or software that can transmit or receive data packets, instruction signals or data signals over a communication link. The communication device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, or firmware.

The term "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communication device can cause the device to carry out a predetermined function or task. The data packet can include a data packet signal that, when received by a communication device can be implemented in carrying out a predetermined function or task, or processed to render information.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for protecting data traffic from a communication device against fingerprinting or privacy leakage, the method comprising:
   receiving data traffic from a communication device connected to a network;
   analyzing the received data traffic to determine network activity or operational characteristics of the communication device;
   generating forged data traffic for the network based on the determined network activity or operational characteristic of the communication device, wherein generating the forged data traffic comprises randomizing the forged data traffic based on the network activity or operational characteristics of the communication device by,
      generating one of a fabricated source address and a fabricated destination address for the forged data traffic,
         wherein the fabricated source address is a randomized source address that identifies a nonexistent communication device, and
         wherein the fabricated destination address is a randomly selected destination address that matches a typical destination address for data traffic from a type of communication device that is different from a type of the communication device such that the randomly selected destination address differs from a typical destination address of data traffic from the communication device; and
   transmitting the randomized forged data traffic to an external communication device that is located outside the network,
   whereby the transmitted forged data traffic including the one of the fabricated source address and the fabricated destination address adds an entropy factor to the data traffic from said communication device connected to the network.

2. The method in claim 1, wherein the external communication device comprises an Internet Service Provider server.

3. The method in claim 1, wherein generating the forged data traffic comprises at least one of:
   normalizing data traffic based on the network activity or operational characteristics of the communication device; and
   synthesizing data traffic based on the network activity or operational characteristics of the communication device.

4. The method in claim 3, wherein synthesizing data traffic comprises generating at least one of the fabricated source address, the fabricated destination address and payload content data.

5. The method in claim 1, wherein the generating the forged data traffic comprises generating the fabricated destination address.

6. The method in claim 5, wherein the fabricated destination address comprises a website on the Internet.

7. The method in claim 1, wherein the generating the forged data traffic comprises generating the fabricated source address.

8. The method in claim 1, further comprising encrypting the forged data traffic before transmitting the forged data traffic to the external communication device.

9. The method in claim 1, wherein the forged data traffic comprises encrypted data.

10. The method in claim 1, further comprising:
    training a machine learning model based on the analysis of the received data traffic.

11. The method in claim 1, further comprising:
    updating a machine learning model based on the analysis of the received data traffic or the determined network activity or operational characteristics of said communication device.

12. The method in claim 1, wherein said communication device comprises an Internet-of-Things (IoT) device.

13. The method in claim 1, wherein transmitting the forged data traffic to the external communication device comprises sending the forged data traffic through a virtual private network (VPN) tunnel.

14. The method in claim 1, wherein transmitting the forged data traffic to the external communication device comprises:
    dividing the forged data traffic for the network into two or more forged data traffic streams; and
    sending the forged data traffic streams to two or more VPNs through two or more virtual private network (VPN) tunnels,
    wherein the two or more forged data traffic streams include the received data from said communication device.

15. A system for protecting data traffic from a communication device against fingerprinting or privacy leakage, the system comprising:
    a receiver arranged to receive data traffic from a communication device connected to a network;
    an activity monitor arranged to analyze the received data traffic to determine network activity or operational characteristics of the communication device;
    a traffic synthesizer arranged to generate forged data traffic for the network based on the determined network activity or operational characteristic of the communication device, wherein the forged data traffic is randomized based on the network activity or operational characteristics of the communication device by generating one of a fabricated source address and a fabricated destination address for the forged data traffic wherein the fabricated source address is a randomized source address that identifies a nonexistent communication device, and wherein the fabricated destination address is a randomly selected destination address that matches a typical destination address for data traffic from a type of communication device that is different from a type of the communication device such that the randomly selected destination address differs from a typical destination address of data traffic from the communication device; and
    a transmitter arranged to transmit the forged data traffic to an external communication device that is located outside the network,
    whereby the transmitted forged data traffic including the one of the fabricated source address and the fabricated destination address adds an entropy factor to the data traffic from said communication device connected to the network.

16. The system in claim 15, wherein the external communication device comprises an Internet Service Provider server.

17. The system in claim 15, wherein the traffic synthesizer is arranged to normalize, randomize or synthesize data traffic based on the network activity or operational characteristics of the communication device.

18. The system in claim 17, wherein synthesized data traffic comprises at least one of the fabricated source address, the fabricated destination address and synthesized payload content data.

19. The system in claim 15, further comprising:
a source/destination synthesizer arranged to generate at least one of the fabricated source address and the fabricated destination address.

20. The system in claim 19, wherein the fabricated destination address comprises a website on the Internet.

21. The system in claim 15, wherein the forged data traffic comprises the fabricated source address.

22. The system in claim 15, further comprising;
an encryptor arranged to encrypt the forged data traffic before transmitting the forged data traffic to the external communication device.

23. The system in claim 15, wherein the forged data traffic comprises encrypted data.

24. The system in claim 15, further comprising:
a machine learning model,
wherein at least one of the activity monitor and traffic synthesizer comprises the machine learning model.

25. The system in claim 24, wherein the machine learning model is trained or updated based on the analysis of the received data traffic or the determined network activity or operational characteristics of said communication device.

26. The system in claim 15, wherein said communication device comprises an Internet-of-Things (IoT) device.

27. The system in claim 15, further comprising:
a virtual private network (VPN) router arranged to send the transmitted forged data traffic to the external communication device through a virtual private network (VPN) tunnel.

28. The system in claim 27, wherein the VPN router is arranged to:
divide the forged data traffic for the network into two or more forged data traffic streams; and
send the forged data traffic streams to two or more VPNs through a respective two or more virtual private network (VPN) tunnels, wherein the two or more streams of forged data traffic are switched between the two or more VPNs for an added entropy factor,
wherein the two or more forged data traffic streams include the received data from said communication device.

29. A non-transitory computer readable storage medium storing computer program instructions that, when executed by a computing device, add an entropy factor to data traffic from a communication device to prevent fingerprinting or privacy leakage, the computer program instructions comprising the steps of:
receiving data traffic from a communication device connected to a network;
analyzing the received data traffic to determine network activity or operational characteristics of the communication device;
generating forged data traffic for the network based on the determined network activity or operational characteristic of the communication device, wherein generating the forged data traffic comprises randomizing the forged data traffic based on the network activity or operational characteristics of the communication device, and the step of randomizing the forged data traffic including,
generating one of a fabricated source address and a fabricated destination address for the forged data traffic,
wherein the fabricated source address is a randomized source address that identifies a nonexistent communication device, and
wherein the fabricated destination address is a randomly selected destination address that matches a typical destination address of data traffic from a type of communication device that is different from a type of the communication device such that the randomly selected destination address differs from a typical destination address of data traffic from the communication device; and
transmitting the forged data traffic to an external communication device that is located outside the network,
whereby the transmitted forged data traffic including the one of the fabricated source address and the fabricated destination address thereby adds an entropy factor to the data traffic from said communication device connected to the network.

* * * * *